(12) United States Patent
Schutz et al.

(10) Patent No.: US 6,518,915 B2
(45) Date of Patent: Feb. 11, 2003

(54) IMPULSE RADAR SECURITY SYSTEM

(75) Inventors: Alan Schutz, Newbury Port, MA (US); Dennis Johnson, North Salem, NH (US)

(73) Assignee: Geophysical Survey Systems, Inc., North Salem, NH (US)

( * ) Notice: Subject to any disclaimer, the term of this patent is extended or adjusted under 35 U.S.C. 154(b) by 0 days.

(21) Appl. No.: 10/013,751

(22) Filed: Nov. 13, 2001

(65) Prior Publication Data

US 2002/0109624 A1 Aug. 15, 2002

Related U.S. Application Data

(60) Provisional application No. 60/248,932, filed on Nov. 15, 2000.

(51) Int. Cl.[7] ............................. G01S 13/56; G01S 7/40; G08B 13/181
(52) U.S. Cl. ............................. 342/28; 342/27; 340/541; 340/552
(58) Field of Search ............................. 342/27, 28, 107, 342/108, 109, 114; 340/541, 545.3, 554, 565, 567, 552

(56) References Cited

U.S. PATENT DOCUMENTS

| | | | |
|---|---|---|---|
| 5,150,099 A | * | 9/1992 | Lienau .................... 342/27 |
| 5,543,778 A | | 8/1996 | Stouffer |
| 5,854,588 A | | 12/1998 | Dockery |
| 6,134,303 A | | 10/2000 | Chen |
| 6,208,248 B1 | | 3/2001 | Ross |

* cited by examiner

Primary Examiner—Ian J. Lobo
(74) Attorney, Agent, or Firm—Madan, Mossman & Sriram, P.C.

(57) ABSTRACT

The present invention provides a security system that can provide a user with data on the directional movement, velocity and location of an object within and around the perimeter of a structure with the use of radio energy. The system comprises a sensor unit having at least one antenna for transmission of a signal into a defined area of the structure. Any intrusion in the area is detected upon a change in the waveform received by the antenna. A received signal is transmitted from the sensor unit to a control unit, comprising, in part, a preprogrammed data processing unit that can determine the movement of the intruder. Utilization of a plurality of sensor units allows the user to obtain additional information on the velocity and location of the intruder. Additionally, as with conventional security systems, the system can provide an electrical signal to activate a sound and/or light device to attract the attention of the intruder and warn others of the intruder's presence.

16 Claims, 5 Drawing Sheets

IMPULSE RADAR SECURITY SYSTEM

CROSS-REFERENCE TO RELATED APPLICATION

This application takes priority from U.S. patent provisional application Ser. No. 60/248,932, filed on Nov. 15, 2000.

FIELD OF THE INVENTION

This invention relates generally to an apparatus for providing security to a structure and, in particular, an impulse radar security system that allows for monitoring the interior and exterior of a residential or commercial structure.

BACKGROUND OF THE INVENTION

Typical electronic security systems include a variety of sensors (i.e., photo, sound and/or motion detectors) that individually communicate with a central control unit. When suspicious or uncharacteristic events occur, sensors sense the event, transmit data to the central control unit, which processes the data and, based upon the defined parameters of the security system, activates an alarm to warn of the event. These types of security systems are quite costly and may require extensive modification to the structure during installation. Additionally, these systems provide minimal information to the user other than to warn of the event.

SUMMARY OF THE INVENTION

The present invention provides a security system that can provide a user with data on the directional movement, velocity and location of an object within and around the perimeter of a structure with the use of radio energy. The system comprises a sensor unit having at least one antenna for transmission of at least one signal into a defined area of the structure and receipt of at least one reflected signal. Any intrusion in the area is detected upon a change in the waveform received by the antenna. The received signal is transmitted from the sensor unit to a control unit, comprising, in part, a preprogrammed data processing unit that can determine the movement of the intruder. Utilization of a plurality of sensor units allows the user to obtain additional information on the velocity and location of the intruder. Additionally, as with conventional security systems, the system can provide an electrical signal to a display device to illustrate the intruder's movement, velocity and location and to activate a sound and/or light device to attract the attention of the intruder and warn others of the intruder's presence.

It is another object of the present invention to provide a security system that allows for rapid, efficient data processing by down-sampling the signal received by the antenna.

It is another object of the present invention to provide a security system that provides for time-variable range gain of the signal proportional to the average signal loss.

It is another object of the present invention to provide a background removal filter that specifically rejects stationary targets and identifies only targets which have changed position over a specified time interval.

It is another object of the present invention to provide a security system that compensates for the undesired gradual shift or change in the output signal over a period of time by incorporating a time-variable background removal filter.

It is another object of the present invention to provide a security system to track and identify a plurality of signals received by the antenna and selectively filter out undesired signals thereby allowing the user to focus on specific objects.

Examples of the more important feature of the invention thus have been summarized rather broadly in order that the detailed description thereof that follows may be better understood, and in order that the contributions to the art may be appreciated. There are, of course, additional features of the invention that will be described hereinafter which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE PREFERRED EMBODIMENT

Figure 1:
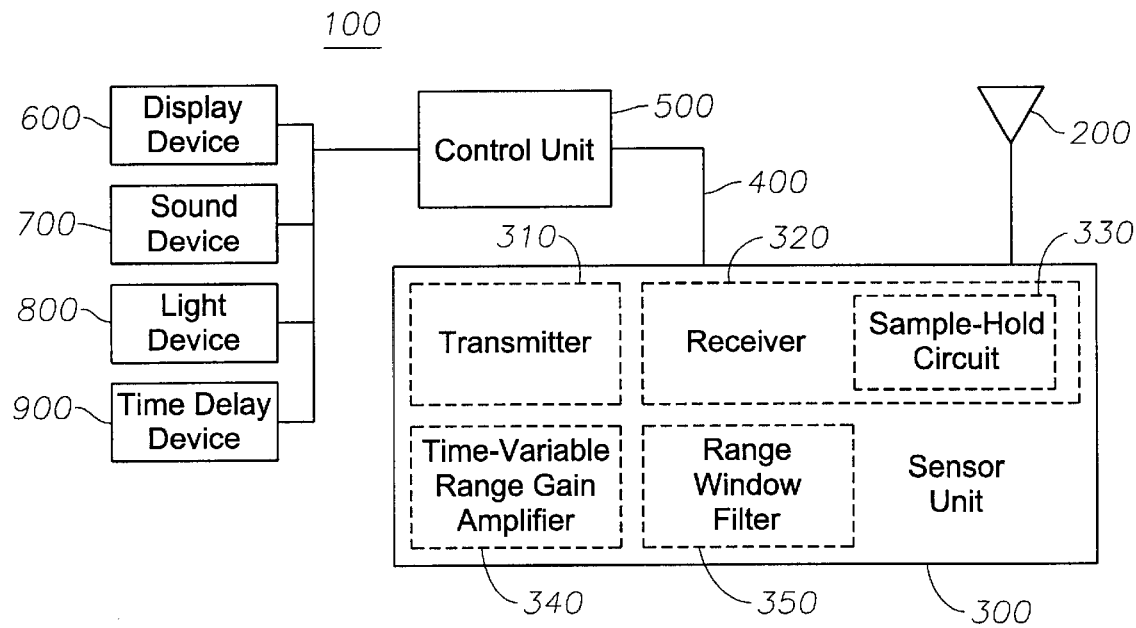
FIG. 1 is a diagram of a monostatic single-sensor security system.

In FIG. 1, a monostatic single-sensor security system 100 of the present invention utilizes radio energy transmitted from and received by at least one antenna 200 incorporated in a sensor unit 300 that includes a transmitter 310 and receiver 320. The nominal center frequencies of the transmitted signal(s) is typically in the range of 100 MHz–10 GHz. In a monostatic system, a transmit/receive (T/R) switch, preferably comprising one or more diodes or field-effect transistors (FET), electronically separates at least one first transmitted signal and at least one second received signal. Radio energy received by antenna 200 is transmitted via link 400 to a control unit 500, comprising, in part, a data processing device for storing a third signal. The control unit 500 processes subsequent received signals (i.e., a plurality second signals) and compares the plurality of second signals to the third signal to determine the directional movement of an object or target.

With a stationary target, each signal received after an initial scan of the monitored area will appear substantially identical. Physical movement within the monitored area will alter the characteristic of the received signals. The received signals are continuously averaged to generate a nominal received signal. The average received signal is subtracted from each succeeding received signal. As stated above, if there is no movement within the monitored area the average received signal and each succeeding received signal will be substantially identical and no signal will result following the subtraction process. If movement does occur within the monitored area, a signal will result after the subtraction process and this signal may be displayed on a display device 600, such as a cathode-ray tube (CRT), liquid crystal display (LCD) or optical fiber display device. Depending upon the parameters established in the control unit 500, output signals may be sent to a sound device 700 and/or light device 800 to warn of an intrusion or other event.

A time delay device 900 or a remote control unit (not shown) may be used to allow the user to initialize the system without prematurely activating the system at the same time.

The preferred embodiment utilizes an ultra wide band (UWB) signal, which is commonly used in ground-penetrating radar to obtain measurements of subsurface structures and provide images of the internal structure of opaque materials such as soil, rock, concrete, asphalt and wood. UWB is generally defined as signals whose bandwidth is at least 25% of the nominal center frequency. With ground-penetrating radar, very short bursts of radio energy are emitted into the ground and echoes from buried targets are received in return. This technology can detect targets underground and, in the present application, through walls and floors of structures.

Radio energy used in the security system 100 can take several forms. In the preferred embodiment, radio energy in the form of an impulse is employed. The impulse can last from 0.1 to 10 nanoseconds. The actual waveform may be one or two cycles of a damped sinusoid. The security system 100 operates in the time domain. Signals or echoes will typically travel 1 nanosecond per foot in air (one-way travel) and signals returning to the antenna after striking a target will arrive at different times depending on the target's distance from the transmitting antenna. Therefore, the distance of an object causing a reflected echo will be determined by the particular delay in the echo return (i.e., an object at a distance of 10 feet will return an echo in 20 nanoseconds, while an object at 20 feet away will return an echo in 40 nanoseconds).

A UWB signal is preferred because of the improved resolution/penetration tradeoff. Lower frequency signals, approximately 100 to 500 MHz, penetrate farther, especially when they are transmitted into the ground or a wall of a structure. However, resolution deteriorates with the use lower frequency signals. Since resolution is a function of the total length of a radio frequency (RF) burst, having fewer numbers of cycles of a waveform will minimize resolution. Having one or two cycles will result in better resolution for a particular selected frequency, therefore resulting in the preferred signal having an ultra wide bandwidth.

Although the preferred embodiment of the invention relies on an impulse signal, those versed in the art will appreciate that alternative sigrnials are directly relevant. These alternative signals include wide-band, swept continuous wave (CW), stepped CW and coded pulse trains.

Wide-band signals are similar to UWB signals. However, wide band signals typically have a greater number of cycles per waveform. The amplitude of the cycles is not constant, but rather ramps up and down and the envelope of the waveform typically resembles a Gaussian pulse. The bandwidth of such a waveform is less than the 25% of a UWB signal and may be small enough to fit inside an assigned frequency band. In contrast, a UWB signal is necessarily spread over many bands.

A variable-frequency sinewave is generated with a swept CW signal. The frequency of a swept CW signal is varied continuously and linearly from a minimum value to a maximum value. The sweep rate of the frequency is extremely linear, in that the frequency increases (or decreases) at a constant rate. Therefore, the frequency difference between any two time-points is constant and the frequency returned from a target is always a specific difference from the frequency being output by the antenna at that time. When the reflected signals, or echoes, are mixed with the transmitter signal, the difference frequencies will identify the target distances by their values. This set of difference frequencies is applied to a Fast Fourier Transform (FFT) and the output resembles the time waveform of the impulse system.

A system utilizing a stepped CW signal comprises a constant frequency sinewave output for a sufficient time period to reach equilibrium. This process is repeated at different frequencies, typically between 128 and 1,024 frequencies. The output of this multiplicity of signals is applied to an FFT, resulting in an output similar to the time waveform of the impulse system.

In a system utilizing a coded pulse. train, a plurality of impulses are output instead of a single impulse. The sequences of pulses are varied so that different transmitters can be differentiated from one another. Typically, the coded sequence of pulses is applied to a real-time correlator that is only sensitive to a particular sequence.

Figure 2:
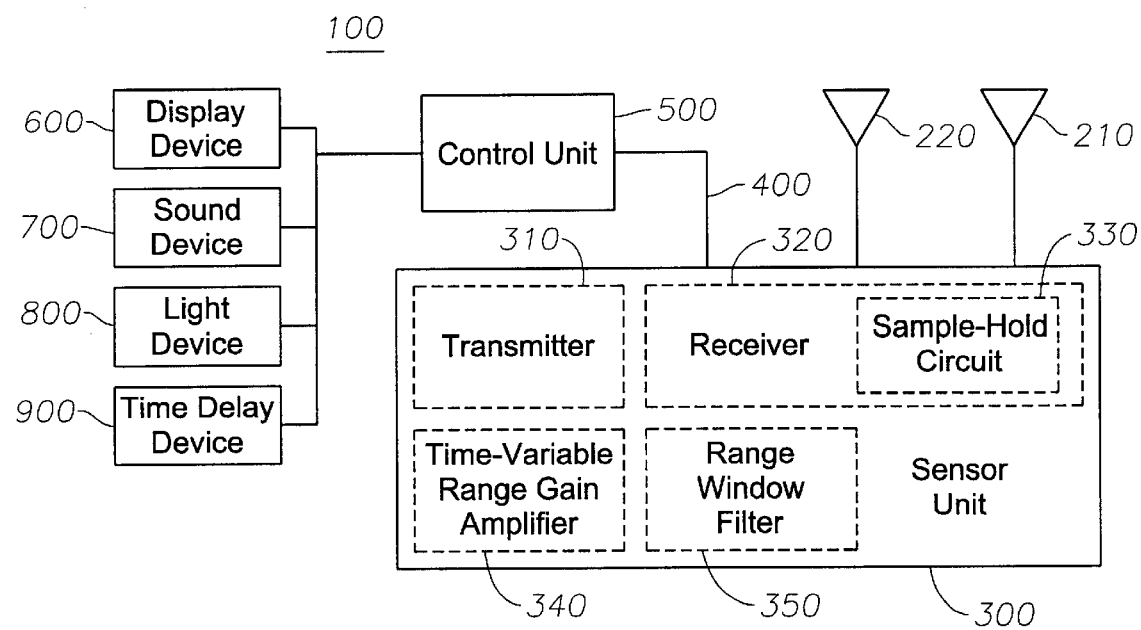
FIG. 2 is a diagram of a bistatic single-sensor security system.

In FIG. 2, a bistatic single-sensor security system 100, at least one second signal received by the receive antenna 210 is applied to a very high-speed sample-hold circuit 330 preferably within receiver 320. The sample-hold circuit 330 outputs at least one sampled or low frequency signal to the control unit 500. The sampled or low frequency signal is proportional to the second signal at a sequence of points in its waveform. Subsequent samples may be taken at different points in subsequent waveforms of the second signal. This process is called down sampling. The result is the creation of a duplicate RF signal at a significantly lower frequency, typically within the audio-frequency spectrum, than the first or second signal frequency. This audio-frequency waveform or sampled signal provides for more efficient processing of the signal by the control unit 500.

As the RF signal or first signal moves away from the transmitting antenna 220, it is reduced in amplitude because of geometric spreading. When the signal strikes a target and is reflected back to the receiving antenna 210 as the second signal, the amplitude of the wave is further reduced on the returri trip. Therefore, the signal will be reduced geometrically with time. The relatively weak signal must be amplified before it can be appropriately digitized for further processing by a digital processing element, such as a 12, 14 or 16 bit A/D converter. Alternatively, the time variable range gain amplifier may be eliminated from the system when using a higher resolution A/D converter, such as a 24-bit converter. A time-variable range amplifier 340 applies a gain to the signal proportional to the average signal loss. Initially the gain is set experimentally and after amplification the gain is fixed and the signal is approximately the same level over the range window or range of interest.

The system can be set to have a particular "range window", as referred to above. With the use of a range window filter 350 or a range window program stored as an algorithm in memory in control unit 500, echoes or returning signals that arrive within a prescribed time will be accepted. For example, if a range window of 0 to 100 nanoseconds is selected, then objects within 50 feet of the receiving antenna 210 will be detected and objects at distances greater than 50 feet will be ignored. Therefore, the range window filter 350 defines the area to be monitored by accepting signals within the defined monitored area and rejecting, signals outside of the defined monitored area.

Figure 3:
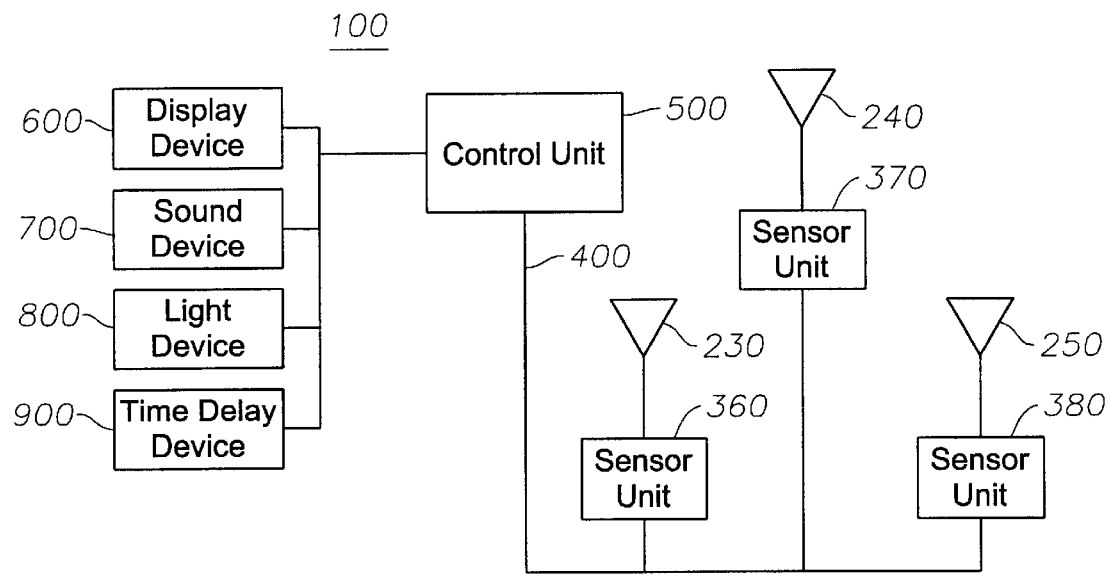
FIG. 3 is a diagram of a two-dimensional security system.
Figure 4:
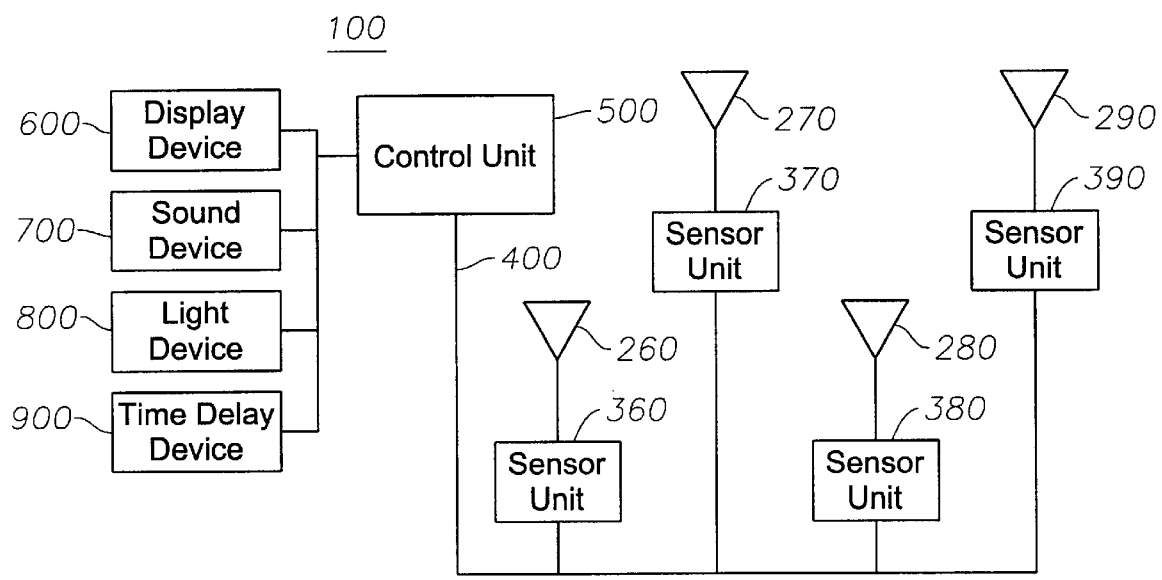
FIG. 4 is a diagram of a three-dimensional security system.

Referring again to FIG. 1, if it is desired to detect objects within a defined distance from the antenna, then a single, omni-directional antenna 200 is sufficient. However, if a larger area is to be monitored, either two- or three-dimensionally, additional antennas will be required. For example, if all possible targets are on a single plane, such as a warehouse with only a single floor, three antennas 230, 240 and 250 can triangulate and locate the target as shown in FIG. 3. If multiple floors or levels are present within the structure, then full three-dimensional positioning may be required and at least four antennas 260, 270, 280 and 290 will be required as shown in FIG. 4. Three antennas are sufficient to survey the third dimension above the ground floor if the antennas are on the ground floor and there are no floors under the ground floor. In some instances it may be advantageous to use more than the required minimum number of antennas because of interference at certain locations or obstructed views due to large metal objects.

Upon receipt of the sampled or low frequency signal(s) from the sensor unit 300, the control unit 500 processes the signal data to determine the movement of objects from their initial positions present when the system 100 is initialized. The, third signal, discussed below, is stored in the digital processing circuitry (not shown), specifically in the random-access memory (RAM) 512, within the control unit 500. This signal is then subtracted from the subsequent sampled signals. If an object has not changed position following initialization of the system 100, no signal will be present. For example, when a person moves into the range of an antenna, a subtracted signal will contain a signal at a time of 2 nanoseconds/foot from the antenna to the person. Because of reverberations between a person and other objects, there may be signals after the initial signal. However, the initial signal will be at 2 nanoseconds/foot.

Security systems are commonly in operation for extended periods of time and there may be some drift in the electronic circuits because of changes in the surrounding temperature. This drift can cause the subtraction process to be less than optimal. In order to avoid this problem, a background removal filter 530, comprising, in part, an algorithm stored in read-only memory (ROM) 510 within the control unit 500 is used. The background removal filter 530 rejects stationary objects while simultaneously allowing for the identification of objects that have changed position over a specified period of time. The change in position of objects may be obtained based upon a comparison of a fixed waveform, obtained when the system is initialized and which is representative of the protected perimeter, to subsequent waveforms representative of the same perimeter. Alternatively, instead of subtracting out a fixed waveform when the system 100 is initialized, a third signal averaged over a considerable time period may be used in the subtraction process. In the simplest and preferred embodiment, an infinite impulse response (IIR) filter is used in the system 100. The received signal is composed of a number of "range bins". Each nanosecond corresponds to a certain distance or "range". Typically there may be 50 to 500 range bins, with each one of these m range bins applied to an IIR filter. The simplest version is a single-pole filter. A signal $S_i$ is representative of the $I^{th}$ range bin. This signal $S_i$ is divided by a number n, where n is a large value. The current average signal at the $I^{th}$ range bin is $A_i$, which is multiplied by (n1)/n. The two signals are added together to form the new average:

$$A_{i+1} = A_i(n-1)/n + S_i/n, \text{ for } i=1 \text{ to } m$$

The processed detection signal is formed by subtracting the current signal from the current average signal:

Detected signal=$S_i$=$A_i$, for i=1 to m

This subtraction is performed separately on each of the m range bins, as previously mentioned, typically between 50 and 500. For illustration purposes, 256 range. bins will be used. When each of these 256 range-bin signals are reassembled into a continuous waveform, they convey whether and where an object has moved within the preset range of the system.

The background removal filter 530 must be set slow enough so that an intruder could never move slowly enough to confound the system 100, but fast enough to avoid electronic drift problems. For example, if a range is established at 25.6 feet and there are 256 range bins, then each range bin represents a distance of 1/10 foot or 1.2 inches. If it is assumed that no individual can move slower than 1.2 inches in 5 minutes and that the system can acquire one data set per second, then the n parameter is set to 300 (5 minutes*60 seconds per minute*1 calculation per second). Therefore, a trivial change in parameter n sets a faster or slower response. Experience in different situations will determine the appropriate value for n. Although the usual course is to make the parameter n constant over the m separate filters, this is not necessary in that some circumstances may dictate different values for n over the set of m filters. Those versed in the art can easily identify other implementations equivalent to background removal. For example, if the electronic circuits are indeed stable enough, an initial signal representative of the monitored area may be stored in memory and used to subtract from subsequent received signals.

When the system 100 is first energized, unless initialized properly, it will take approximately three time constants to settle and be ready for proper operation. In the above example, the time constant was set at five minutes, so the settling time would be fifteen minutes. Fifteen minutes is clearly too long of a period of time to allow before the system becomes operational. One way of resetting the system 100 is to take a first scan, or first few scans, and use it as the initial average. A more robust system will set the initial average to be equal to the first set of data and then use a variable n. Each time a data set is collected, the value of n is incremented by one. This increase continues until n reaches the preset value. In the example above, n is set to 1, on the second data set n is set to 2 and so forth. This continues until n=300 (at five minutes) and thereafter n will remain at 300.

In all cases it is necessary to set a time delay to allow the operator to leave the room or structure before the system is initialized. The system will detect the departure of a person from the area in the same manner as the system detects the entrance of a person. Therefore, a time delay device 900 may be used permit the user to delay activation of the system. Alternatively, the system could be set remotely through the use of a standard coded remote control unit.

In initializing the system 100, it is necessary to set a detection level. Different situations will require a different level for the system 100. For example, small household pets or outdoor pets should not set off the system. The detection level element is preferably an algorithm stored in ROM 510 in control unit 500. Alternatively, the detection level element may be a self-taught filter that determines the proper detection level.

The basic operation of the system 100 is to identify the location of moving objects, however, the velocity of the objects may also be determined. For example, a system may be used to monitor a backyard swimming pool to prevent intruders from using the pool and possibly resulting in an "attractive nuisance" lawsuit. Or, when parents and children are using the pool, the system may be, used to activate a device, such as a horn, when a child runs alongside the pool, which could result in injury to the child.

Many objects exist in most households where the system 100 may typically be used. When a person walks into the house, he or she will create a primary target at a distance measured by the distance between individual and the antenna 200. The transmitted signal(s) will reflect off the individual and other objects in the monitored area. These reflected signals will also be detected by the system 100 and will occur at times later than the primary reflected signal. Therefore, it will appear that there are targets farther away than the primary target. By processing the plurality of multiple sequential scans, the signals may be tracked and identified as such. One of many such processes is called deconvolution, wherein the signals from stationary objects or targets outside of the defined monitored area may be eliminated and the multipath signals, which may be from a target of interest, are eliminated or combined with the signal representative of the original direct path, thereby creating a single target from the multiple reflections.

As stated above, the basic system 100 comprises a single transmitting and receiving antenna 200 having a set range of operation. This system will typically be set up either in a structure, or-outside, in an area to be monitored. The user will define a perimeter a specific distance from the system. Movement of any large object within that radius will activate an alarm, which may comprise a sound device 700 or light device 800. Alternatively, segments surrounding the antenna may be shielded to eliminate monitoring of certain areas. Unless shielding occurs, targets above and below the horizontal plane of the antenna will be detected.

Referring to FIG. 3, placement of at least three sensor units 360, 370 and 380 on a horizontal plane can locate a target's position two- or three-dimensionally. However, ambiguity exits as to whether the target is above or below the antennas 230, 240 and 250. For example, if antennas 230, 240 and 250 are on a second floor of a three-story building, a target one floor away can be on either the ground floor or the third floor. However, if antennas 230, 240 and 250 are on the ground floor and there is no basement, targets located on floors above the antennas can be located. Therefore, a multi-story building should have a sufficient number of antenna or sensors on each story to have complete and redundant coverage.

Once an area is inundated with radio waves, it is necessary to define the area to be protected. In the basic monostatic single-sensor system as shown in FIG. 1, the monitored area will comprise the defined radius around sensor unit 300. In multiple antenna systems, as shown FIGS. 2–6, there is more flexibility and complexity in defining the area to be monitored. Since the system allows for identification of the location of targets within a two- or three-dimensional space, it is necessary to clearly define the monitored perimeter. For example, a residential structure may be monitored from the center of the structure to the outside walls. At night, the monitored perimeter could be defined from the outside walls to 2 meters beyond the outside walls, thereby permitting movement within the structure without setting off the system alarm.

In order to define the monitored perimeter, it is necessary to carefully survey the area. There are several ways of performing the survey. The first method comprises using blueprints and tape measures. This method is subject to the usual errors. The second method is to use surveyed targets. In using this method, a reflecting target is moved around the perimeter of the structure. The reflecting target may be simply a 1-meter square sheet of aluminum or a corner reflector. The control unit 500 will monitor the target as it is moved around the perimeter and record the signal data for future use. The approximate location of the sensor units will be identified in the control unit 500 by the user. As long as there are redundant sensor units, this process can be used to locate the sensors. For example, if three sensors are used and all action takes place on one horizontal plane, there is sufficient redundancy for calibration purposes. The best way of quickly performing the above calibration is if all of the signal data is passed through a Kalman filter.

A third method of surveying an area involves using a device called a spread spectrum localizer (SSL), which is described in U.S. Pat. No. 5,748,891 and is incorporated by reference. Using this method, the SSL device is placed on each sensor unit. These devices are able to determine their distance from each other with no additional outside information. Therefore, they can locate each other in three-dimensional space precisely. The defined cube of sensor units must be positioned three-dimensionally inside the structure. This can be done by either using a moving target, as described above, or by moving an additional SSL sensor around the perimeter.

A set of sensor units can be configured in a variety of ways. A basic configuration comprises a sensor unit 300 with both a transmitting antenna 220 and a receiving antenna 210, as shown in FIG. 2. Target position data obtained from within the defined area is transmitted from the sensor unit 300 to the control unit 500. As shown in FIG. 3, all sensor units 360, 370 and 380 in a basic configuration are independent of one another. The only common element between the sensor units 360, 370 and 380 is control unit 500 to which each sensor unit communicates via a low speed data link 400 which may comprise, for example, a wire link, optical fiber, radio link, infrared link or ultra-sound link.

Figure 5:
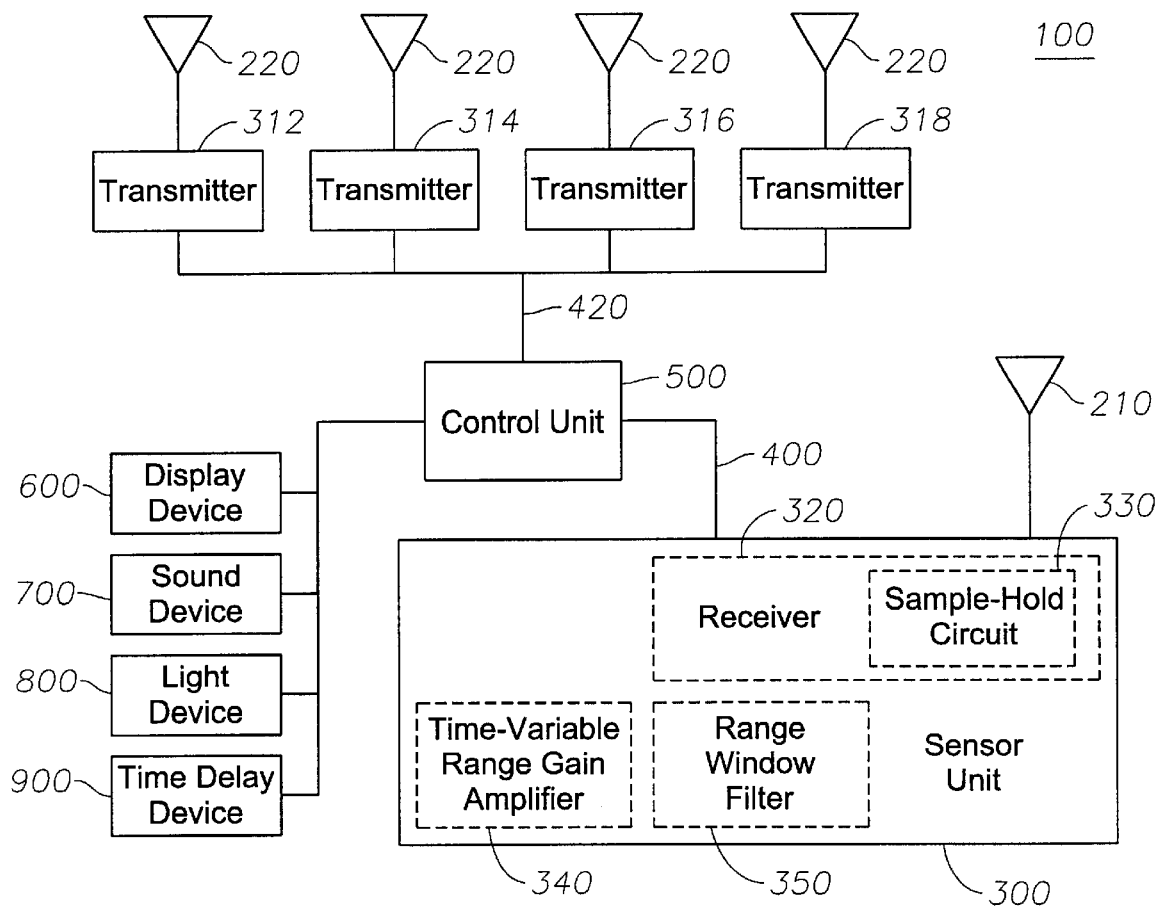
FIG. 5 is a diagram of a multi-transmitter, single sensor security system.

FIG. 5 illustrates an alternative configuration comprising multiple transmitters 312, 314, 316 and 318 separate from sensor unit 300. The sensor unit 300 has a receiving antenna 210 and, possibly, a transmitting antenna (not shown). transmitters 312, 314, 316 and 318 are located in other areas of the structure and are controlled by the single sensor unit 300. This configuration requires a highspeed link 420, which will typically be a coaxial cable. An alternative configuration may comprise at least a pair of SSL elements for high-speed data transfer in place of a coaxial cable.

Figure 6:
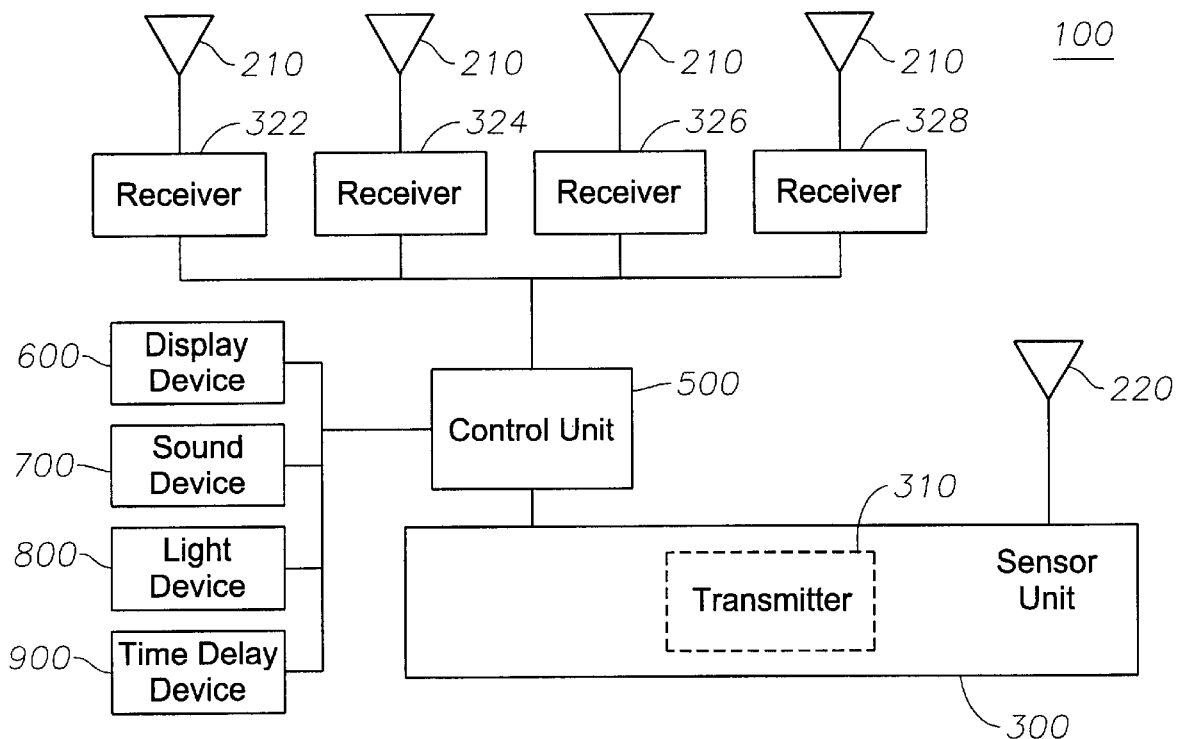
FIG. 6 is a diagram of a multi-receiver, single sensor security system.

As shown in FIG. 6, these multiple units can be configured so that a single transmitter 310 within the sensor unit 300 can be used by multiple receivers 324, 326 and 328. Similarly, the configuration could comprise at least one transmitter in communication with a sensor and a plurality of remote receivers.

For the basic system 100, a sound device 700 or light device 800 may be sufficient to alert the system user when movement occurs within the monitored area. However, the monitoring function requires a more sophisticated output display 600 because emphasis is placed on monitoring the continuous positions of objects within the defined area. A preferred device is a three-dimensional wire-frame display of the structure or area containing symbols of the objects detected.

Figure 7:
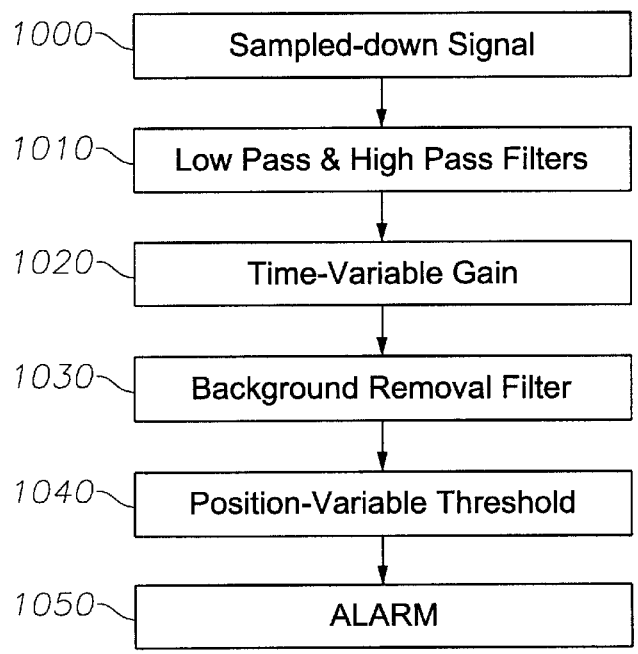
FIG. 7 is a flow chart of the signal processing for a single-sensor security system.

FIG. 7 illustrates the steps of processing a signal in a single-sensor system. The processing of the signal requires elements of both the sensor unit and control unit. Upon receipt of a signal by the antenna, the signal passes through a high-speed sample-hold circuit that outputs a sample or low frequency signal proportional to the RF signal at a single point in its waveform at step 1000. The sampled signal passes through low pass and high pass filters at step 1010 and is then amplified, at step 1020, proportional to the average signal loss of amplitude caused by geometric spreading when the signal is transmitted from the transmitting antenna. The signal proceeds to a background removal filter at step 1030, which compensates for the undesired gradual shift or change in the output signal over a period of time. The signal continues through the process to the position-variable threshold at step 1040 prior to activation of an alarm at step 1050.

Figure 8:
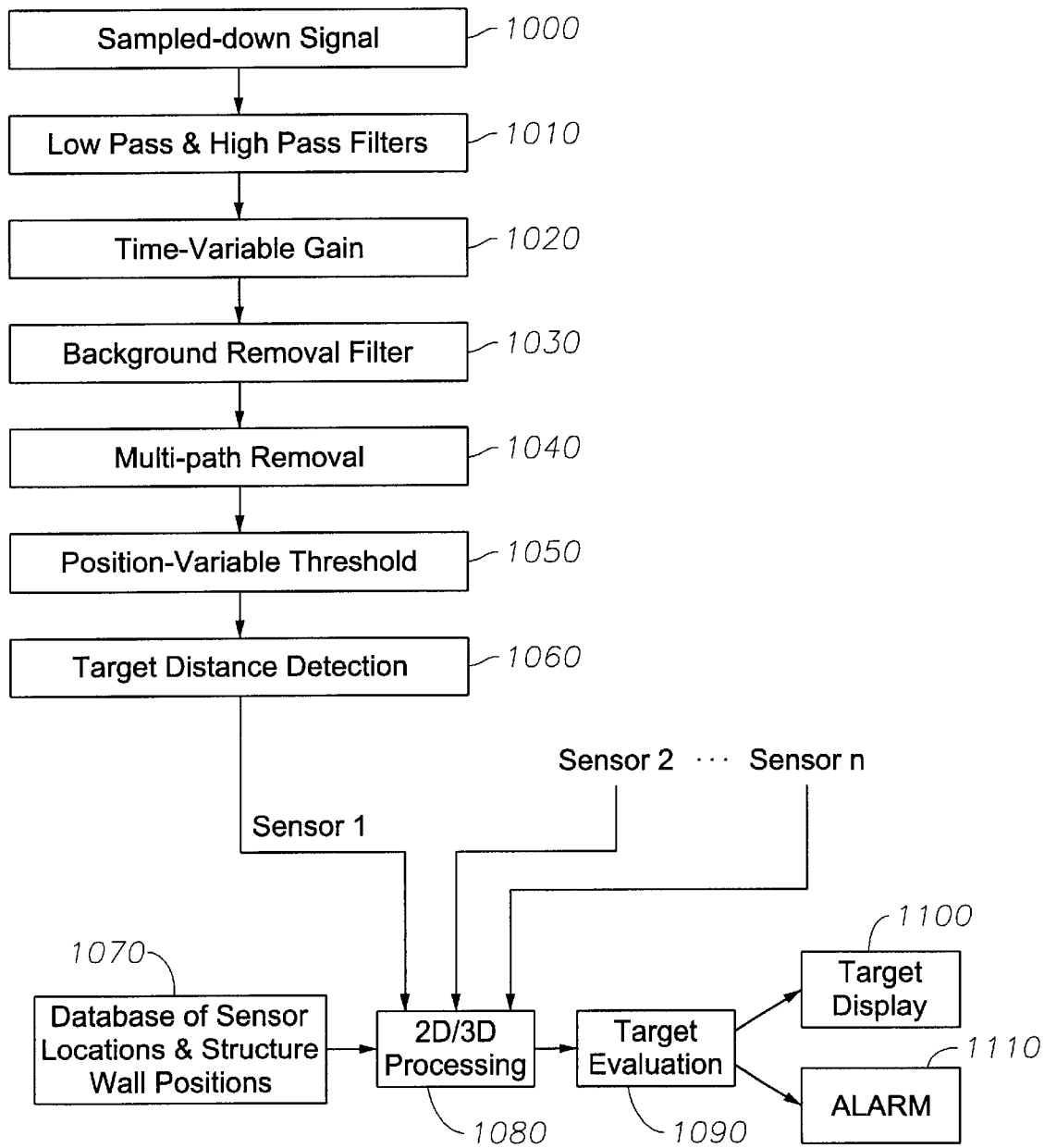
FIG. 8 is a flow chart of the signal processing for a multi-sensor security system.

FIG. 8 illustrates the steps of processing signals inma multiple-sensor system. Upon receipt of signals by the antenna, the signals pass through a high-speed sample-hold circuit, which outputs a sampled or low frequency signal proportional to the RF signal at a single point in its waveform at step 1000. The signal pass through low pass and high pass filters at step 1010 and are then amplified, at step 1020, proportional to the average signal loss of amplitude caused by geometric spreading when the signals are transmitted from the transmitting antenna. The signals proceed to a background removal filter at step 1030, which compensates for the undesired gradual shift or change in each output signal over a period of time. Next, the multiple sequential scans are tracked and identified at step 1040. The position-variable threshold is determined by analyzing the signals in step 1050 and then the target distance is determined from each signal at step 1060. A database storage of sensor unit locations and structural dimensions are accessed at step 1070 and are utilized in the two- and three-dimensional processing of the signals at step 1080. Target evaluation is performed at step 1090 prior to display of relevant information at step 1100 and activation of an alarm at step 1110.

The foregoing description is directed to particular embodiments of the present invention for the purpose of illustration and explanation. It will be apparent, however, to one skilled in the art that many modifications and changes to the embodiment set forth are possible without departing from the scope and the spirit of the invention. It is intended that the following claims be interpreted to embrace all such modifications and changes.

What is claimed is:

1. A radar security system for a residential or commercial structure, comprising:
    a) a sensor unit electrically connected to at least one antenna for, generation and transmission of at least one first signal and receipt of at least one reflected second signal, said sensor unit comprises a sample-hold circuit for sampling said at least one second signal, wherein said at least one second signal comprises a plurality of reflected signals at a sequence of points in a waveform of said at least second signal for generating at least one sampled signal having a substantially identical amplitude as said at least one second signal and a lower frequency than said at least one second signal allowing for efficient data processing;
    b) a control unit comprising a read-only memory (ROM) for storage of an algorithm used in conversion of said at least one sampled signal to a third signal comprising an average waveform obtained over a specified time interval, said control unit electrically connected to said sensor unit through a linking element for comparing said at least one sampled signal to said third signal and generating a fourth signal indicative of a parameter of interest upon determination of a deviation between said at least one sampled signal and said third signal; and
    c) a display device electrically connected to said control unit for receiving. said fourth signal and displaying said parameter of interest.

2. The radar security system of claim 1, wherein said control unit further comprises a random-access memory (RAM) for storage of said third signal.

3. The radar security system of claim 1, wherein said sensor unit further comprises a time-variable range amplifier providing signal gain proportional to an average signal loss in transmission of said at least one first signal and receipt of said at least one second signal.

4. The radar security system of claim 1, wherein said sensor unit further comprises a range window filter providing for the acceptance of signals representative of a moving object over a specified time interval and rejection of signals representative of a stationary object over said specified time interval.

5. The radar security system of claim 1, wherein said at least one first signal is one of: (i) an ultra wide band signal within the radio spectrum; (ii) a wide band signal within the radio spectrum; (iii) a swept continuous wave signal within the radio spectrum; (iv) a stepped continuous wave signal within the radio spectrum; and (v) a coded pulse train signal within the radio spectrum.

6. The radar security system of claim 1 further comprising a transmit/receive switch for electrically separating said at least one first signal and said at least one second signal wherein said at least one antenna comprises a single antenna.

7. The radar security system of claim 6, wherein said transmit/receive switch comprises at least one diode.

8. The radar security system of claim 6, wherein said transmit/receive switch comprises at least one field-effect transistor.

9. The radar security system of claim 1, wherein said display device is a three-dimensional wire-frame display.

10. The radar security system of claim 1 further comprising a sound device electrically connected to said control unit for receiving said fourth signal and producing a sound in response to said fourth signal.

11. The radar security system of claim 1 further comprising a light device electrically connected to said control unit for receiving said fourth signal, and illuminating said light device in response to said fourth signal.

12. The radar security system of claim 1 further comprising a time delay device to allow a user to initialize the system without prematurely activating the system.

13. The radar security system of claim 1 wherein the link element is one of (i) a coaxial cable; (ii) a wire link; (iii) an optical fiber; (iv) a radio link; (v) an infrared link; and (vi) an ultrasound link.

14. The radar security system of claim 1 wherein the parameter of interest is one of (i) directional movement of an object; (ii) velocity of said object; and (iii) position of said object.

15. A method of processing a signal in a radar security system having a single, sensor unit, comprising:
    (a) transmitting at least one first signal from an antenna into a predefined area;
    (b) receiving at least one reflected second signal at said antenna;
    (c) sampling said at least one second signal, wherein said at least one second signal comprises a plurality of reflected signals at a sequence of points in a waveform of said at least one second signal for generation of at least one low frequency signal proportional to said at least one second signal with a sample-hold circuit;
    (d) amplifying said at least one low frequency signal proportional to an average signal loss with a time-variable range amplifier thereby providing nominal signal levels equal over a range of interest;

(e) comparing said at least one low frequency signal to a third signal representative of an average waveform of said at least one low frequency signal over a specified time interval stored in memory in a control unit in determining if there is any deviation between said third signal and said at least one low frequency signal thereby establishing physical movement within said predefined area and generating a fourth signal; and (f) transmitting said fourth signal from said control unit to a display device to display a parameter of interest of (i) directional movement of an object; (ii) velocity of said object; and (iii) position of said object.

16. A method of processing a signal in a radar security system having multiple sensor units, comprising:

(a) defining an area to be monitored by the radar security system;

(b) identifying the location of each of the sensor units and storing the location into a memory of a control unit;

(c) transmitting at least one first signal from at least one antenna into a predefined area;

(d) receiving at least one reflected second signal at said at least one antenna;

(e) sampling said at least one second signal, wherein said at least one second signal comprises a plurality of reflected signals at a sequence of points in a waveform of said at least one second signal for generation of at least one low frequency signal proportional to said at least one second signal with a sample-hold circuit;

(f) amplifying said at least one low frequency signal proportional to the average signal loss with a time-variable range amplifier thereby providing nominal signal levels equal over a range of interest;

(g) comparing said at least one low frequency signal to a third signal representative of an average waveform of said at least one low frequency signal over a specified period of time stored in memory in a control unit in determining if there is any deviation between said third signal and said at least one low frequency signal thereby establishing physical movement within said predefined area and generating a fourth signal;

(h) tracking and identifying said at least one second signal; and (i) transmitting said fourth signal from said control unit to a display device to display a parameter of interest of (i) directional movement of an object; (ii) velocity of said object; and (iii) position of said object.

* * * * *